United States Patent
Kiefer et al.

(10) Patent No.: US 12,070,846 B2
(45) Date of Patent: Aug. 27, 2024

(54) SYSTEM AND METHOD FOR INSERTING OR REMOVING CUTTING INSERTS OF A CUTTING TOOL

(71) Applicant: Premium Aerotec GmbH, Augsburg (DE)

(72) Inventors: Lucas Kiefer, Augsburg (DE); Christian Maeusle, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 178 days.

(21) Appl. No.: 17/537,914

(22) Filed: Nov. 30, 2021

(65) Prior Publication Data

US 2022/0168901 A1 Jun. 2, 2022

(30) Foreign Application Priority Data

Dec. 1, 2020 (DE) ...................... 10 2020 131 839.1

(51) Int. Cl.
*B23C 7/00* (2006.01)
*B25J 11/00* (2006.01)
*B25J 15/06* (2006.01)

(52) U.S. Cl.
CPC ......... *B25J 11/005* (2013.01); *B25J 15/0608* (2013.01); *B25J 15/0616* (2013.01)

(58) Field of Classification Search
CPC .. B25J 11/005; B25J 15/0608; B25J 15/0616; B23C 7/00; B23C 9/005; B23C 7/02
See application file for complete search history.

(56) References Cited

U.S. PATENT DOCUMENTS

2016/0297013 A1* 10/2016 Hebuterne ............. B23P 19/06

FOREIGN PATENT DOCUMENTS

| CN | 109262041 A | * | 1/2019 | ............... B23C 5/10 |
|---|---|---|---|---|
| IT | H0691467 A | | 4/1994 | |
| JP | S61146444 A | | 7/1986 | |
| JP | S6464715 A | | 3/1989 | |
| JP | H03196928 A | | 8/1991 | |
| JP | 06126572 A | * | 5/1994 | |
| JP | H06126572 A | | 5/1994 | |
| JP | H06179141 A | | 6/1994 | |

OTHER PUBLICATIONS

Extended European Search Report for Application No. 21211239.5 dated May 12, 2022, 31 pages. [See p. 6, categorizing the cited references].

* cited by examiner

Primary Examiner — Randell J Krug
(74) Attorney, Agent, or Firm — Lerner David LLP

(57) ABSTRACT

A system for inserting and removing cutting inserts of a cutting tool includes a first processing device, a second processing device, and a controller coupled to the first processing device and the second processing device, wherein the first processing device includes a gripping element for holding or securing a cutting insert, wherein the second processing device includes a fastening tool for fastening or releasing a fastening mechanism holding the cutting insert, and wherein the control is adapted to control the first processing device to hold the cutting insert, to control the second processing device to fasten or release the fastening mechanism when the cutting insert is held.

12 Claims, 3 Drawing Sheets

SYSTEM AND METHOD FOR INSERTING OR REMOVING CUTTING INSERTS OF A CUTTING TOOL

FIELD OF THE INVENTION

The invention relates to a system and method for inserting or removing cutting inserts from tools.

BACKGROUND OF THE INVENTION

Tools for machining workpieces often have replaceable cutting inserts. These are attached to a cutting tool and form cutting edges there. The cutting tool can be rigidly attached to a machine tool, for example in the form of a turning tool, or movable, in particular rotatable, for example as a milling head. Such cutting inserts wear during machining and need to be replaced regularly. Depending on the size of the cutting tool and a cycle of the machine tool, it may be necessary to remove the cutting tool from the machine tool for this purpose and then replace one or more cutting inserts arranged thereon. During the replacement, the machine tool could receive another cutting tool and continue machining in the meantime.

When inspecting cutting inserts, a cutting insert is checked for wear. If necessary, this is then removed from the cutting tool if a certain tolerance is exceeded and, for example in the case of an indexable insert design, turned over or replaced. During turning, its orientation is changed and an alternative cutting edge which is not worn is aligned in the cutting direction. If all cutting edges on the insert are worn, a new insert is fitted.

Such a process is time-consuming and, in the case of larger cutting tools, cannot be carried out manually in an ergonomic manner Automated handling of cutting tools for replacement is hardly feasible in practice, as cutting inserts are sensitive to breakage due to their hardness and are difficult to align and fasten without canting due to their often small size.

BRIEF SUMMARY OF THE INVENTION

Consequently, an aspect of the invention proposes a system or a method for inserting or removing cutting inserts of a cutting tool, which preferably enables a replacement of cutting inserts in a largely automated manner.

A system for inserting or removing cutting inserts of a cutting tool is proposed, comprising a first processing device, a second processing device, and a controller coupled to the first processing device and the second processing device, wherein the first processing device comprises a gripping element for holding or securing a cutting insert, wherein the second processing device comprises a fastening tool for fastening or releasing a fastening means holding the cutting insert, and wherein the controller is adapted to control the first processing device to hold the cutting insert, and to control the second processing device to fasten or release the fastening means when the cutting insert is held.

The first processing device and the second processing device are thus both coupled to the controller and cooperate in the insertion and removal of cutting inserts of a cutting tool. Here, the first processing device is adapted to hold or secure a cutting insert, while the second processing device releases or secures the held or secured cutting insert. The first processing device may thus ensure that the cutting insert is always correctly aligned, so that the second processing device produces or releases its fastening. A cant-free insertion and fastening is thus possible. The risk of damage when removing the cutting insert can also be significantly reduced by holding it by means of the first processing device.

In this context, a cutting insert is an element that can be brought into direct contact with the workpiece in question in order to machine the workpiece. It may be, for example, a cutting insert, in particular an indexable insert. This is attached to the cutting tool by a suitable holder.

In a generally possible embodiment, it is conceivable that the first processing device and the second processing device are located in the vicinity of the relevant machine tool or are capable of reaching it if necessary. However, it may be envisaged to exchange the cutting insert at another location which is independent of the machine tool. For this purpose, it is conceivable that cutting tools from one or more machine tools are brought onto a transport device in order to transport them to another location where the exchange of the cutting inserts takes place. The cutting tool could be removed from the machine tool manually and/or in a partially automated and/or fully automated manner and transported to the position provided for this purpose.

The gripping element of the first processing device is preferably configured to hold the cutting insert so that the second processing device may actuate the fastening means. The holding operation is to be understood in the sense that the first processing device is adapted to hold the cutting insert in a predetermined spatial position. Moreover, the first processing device may be adapted to position the cutting insert such that it may assume a position and orientation intended for interaction with the second processing device. When fastening the fastening means, the first processing device may be configured to compensate for minor forces acting on the cutting insert when inserting the fastening means into a hole or the like.

The gripping element, which may be mechanically coupled to the cutting insert, is provided for holding the cutting insert. Many different embodiments of the gripping element are conceivable which may fulfil the task. For example, movable members enclosing a space between each other are conceivable, which may enclose or clamp the cutting insert between them by moving the members. Alternatively, elements based on fluid technology may be used, for example suction cups or the like.

The second processing device is provided to actuate a fastening means. This may be a clamping and/or screwing device configured to hold the cutting insert to the cutting tool in such a way that during operation of the machine tool and the corresponding loads acting on the cutting insert, the cutting insert remains securely on the cutting tool. It may further be envisaged that the second processing device is adapted to measure and/or limit forces or torques applied during fastening of the fastening means. For example, the second processing device may comprise a screw driving device configured to screw the fastening means to an adjustable limit torque.

The controller is adapted to control the first and second processing devices to first hold and then release or secure the cutting insert. If the cutting insert is already on the cutting tool, the first processing device may secure the cutting insert so that the cutting insert remains in position after the fastening means is released. If the cutting insert is to be attached to the cutting tool, it shall be positioned by the first processing device such that the second processing device may smoothly attach the cutting insert through the fastening means.

Overall, the system according to the invention results in an advantageous, automated device, in particular for replacing cutting inserts of cutting tools. The resulting advantages are particularly immanent when used in environments with a larger number of machine tools, since a manual effort is significantly reduced and at the same time a consistently high precision can be ensured.

In an advantageous embodiment, the system further comprises a separate fixing device for receiving a cutting tool to which the cutting insert is attachable for use, for insertion and removal of the cutting insert with the cutting tool arranged on the fixing device. The cutting tool may be configured to receive a plurality of cutting inserts distributed about a circumferential surface of the cutting tool. The cutting tool together with the cutting inserts could form a cutter that is attached to a rotating element of a machine tool, for example via a Morse taper. The fixing device could, by way of example, have a receiving device corresponding to a receiving device of such a machine tool. The cutting tool may then be removably attached to the fixing device for replacement of the cutting inserts, so that the two processing devices then perform the replacement on the cutting tool aligned by the fixing device. In one embodiment, the first and/or the second processing device may be configured to remove the cutting tool from the machine tool or a transport device and insert it into the fixing device. Preferably, the fixing device is adapted to position the cutting insert or a portion of the cutting tool receiving the cutting insert by moving the cutting tool such that a corresponding fastening means can be handled from a preferred direction, for example vertically from below or from above. Where a cutting tool has a plurality of cutting inserts, the fixing device may be adapted to successively align or present the individual cutting inserts and allow the processing means to perform an exchange. The fixing device is further preferably configured to lock the cutting tool in place, so that when the two processing devices are used, the cutting tool remains in the intended location and orientation.

Further, the fixing device may be arranged in an area that is located in a working area of the first processing device and the second processing device. Thus, both processing devices are able to access the cutting insert which is located at the cutting tool in the fixing device. The working area is to be understood as a spatially delimited space in which parts of the processing device in question can move.

As set out above, the gripping element may comprise a suction gripper or a clamping gripper. In particular, the suction gripper can comprise a suction cup which can be coupled to a vacuum line via a valve. Opening the valve creates a vacuum at the suction cup, so that when the suction cup is on or against the cutting insert, the suction cup holds the cutting insert. A clamping gripper may have a plurality of members which are movable relative to each other, by means of which the cutting insert may be clamped firmly.

The system may further comprise a storage device having at least one receptacle for temporarily storing cutting inserts, the storage device being adapted to insert and remove cutting inserts from the at least one receptacle. The storage device may be placed in proximity to the first processing device to enable the first processing device to remove machining inserts from or insert machining inserts into the storage device. The storage device may be manually and/or automatically loaded with cutting inserts and allows automated replacement. The storage device can be individually tailored to the respective cutting inserts in order to ensure damage-free, safe storage.

The at least one receptacle of the storage device may comprise a centering device formed complementary to the cutting insert and configured to hold the cutting insert in a predetermined orientation. Any cutting insert placed in the fixture may then maintain the predetermined orientation. When the cutting insert is removed from the receptacle, the first processing device is thereby able to guide the cutting insert with the predetermined orientation to the cutting tool without first checking the orientation. Accordingly, the alignment at the centering device may improve the handling of the cutting insert and its correct alignment at the cutting tool. It is of course possible to provide a storage device having different receptacles with different centering devices for different cutting inserts. Further, a plurality of storage devices may also be provided simultaneously, each having at least one such receptacle. The controller may be adapted to have knowledge of the different storage devices and/or receptacles, or may be adapted to detect their characteristics in order to be able to control the first processing device accordingly. The centering device may be configured to independently align the cutting insert by surface contact with the cutting insert, utilizing the force of gravity. This may also be used to flip an insert, for example, as the first processing device may place an insert with a worn cutting edge into a receptacle so that it aligns itself accordingly, and then re-grip it. This allows different access directions or orientations of the insert on the first processing device.

As an alternative to a passive centering device mentioned above, an actively controlled turning device may also be used.

Preferably, the fastening tool comprises a screw driving device. This may be used to loosen or tighten a screw or bolt as a fastening means. Preferably, the screw driving device has a shank with a profile which may be coupled to a screw or the like so that a torque can be transmitted from the screw driving device to the screw. The shank may be adapted to the installation situation of the particular cutting insert, so that the screw driving device may be moved directly to the screw in question without contacting surrounding parts. It is particularly advantageous if the second processing device is adapted to check an instantaneous orientation of a screw for engagement with the profile by optical image capture and subsequent image analysis, in order to precisely position the screw driving device. The screw driving device may comprise means for receiving a screw to externally approach the screw to the cutting insert. The device could comprise, for example, a magnet. Alternatively, an additional gripping device or a vacuum device may be envisaged. The screw driving device may be connectable to a storage device for providing screws, so that a screw may be removed from the storage device and guided to the cutting insert for fastening the cutting insert.

Furthermore, it is particularly advantageous if at least one of the first processing device and the second processing device is a multi-axis robot. The processing devices may then perform a very wide range of movements and thus be adapted to different machine tools, cutting tools, or fixing devices. The processing devices are then particularly well suited for flexibly exchanging a large number of cutting inserts on different cutting tools, since they have a large working range due to their multi-axis movability.

At least one of the first processing device and the second processing device may be configured to carry a replaceable handling tool. For example, the first processing device may be configured to carry different gripping elements. The second processing device may be configured to carry different fastening tools. Both processing devices may further be adapted to autonomously pick up the respective handling tools from a set of handling tools. The controller may control the processing devices to pick up a handling tool suitable for the intended operation.

It is particularly advantageous if the controller is adapted to read an identifier of the cutting tool when handling a cutting insert, and to control the at least one of the first and second processing devices to receive a suitable handling tool. For example, each cutting insert and/or cutting tool may be equipped with an RFID tag or barcode that makes an identifier readable. Based thereon, the controller may determine what type of cutting tool is present, what cutting inserts are present, and what number of cutting inserts and their arrangement on the cutting tool are present. The controller may then carry out the selection of the handling tool and the positioning of the cutting tool for loosening or fastening the screws by controlling the individual components accordingly, i.e. the processing devices and, if applicable, the fixing device.

The invention further relates to a method of inserting or removing cutting inserts of a cutting tool, comprising the steps of positioning a gripping element of a first processing device on a cutting insert, holding the cutting insert by the gripping element, positioning a fastening tool of a second processing device on a fastening means holding the cutting insert, fastening or releasing the fastening means by means of the fastening tool while the cutting insert is held, positioning a fastening tool of a second processing device on a fastening means holding the cutting insert, fastening or releasing the fastening means by means of the fastening tool while the cutting insert is held, and releasing the cutting insert by the first processing device.

In an advantageous aspect, the method comprises the steps of removing a cutting tool carrying the cutting insert from the machine tool, placing the cutting tool in a fixing device, and after handling the cutting insert with the cutting tool arranged in the fixing device, removing the cutting tool from the fixing device, and inserting the cutting tool into the machine tool.

It is advantageous if the holding comprises applying a vacuum to a suction gripper or moving members of a clamping gripper to clamp the cutting insert.

In a further advantageous aspect, the method may comprise the step of inserting the cutting insert into a centering device of a receptacle of a storage device.

In addition, fastening or loosening may comprise operating a screw driving device on the second processing device.

BRIEF DESCRIPTION OF THE DRAWINGS

Further features, advantages and possible applications of the present invention will be apparent from the following description of the embodiments and the figures. In this context, all the features described and/or illustrated constitute, in themselves and in any combination, the subject-matter of the invention, also irrespective of their composition in the individual claims or their references. Furthermore, in the figures, the same reference signs stand for the same or similar objects.

DETAILED DESCRIPTION

Figure 1:
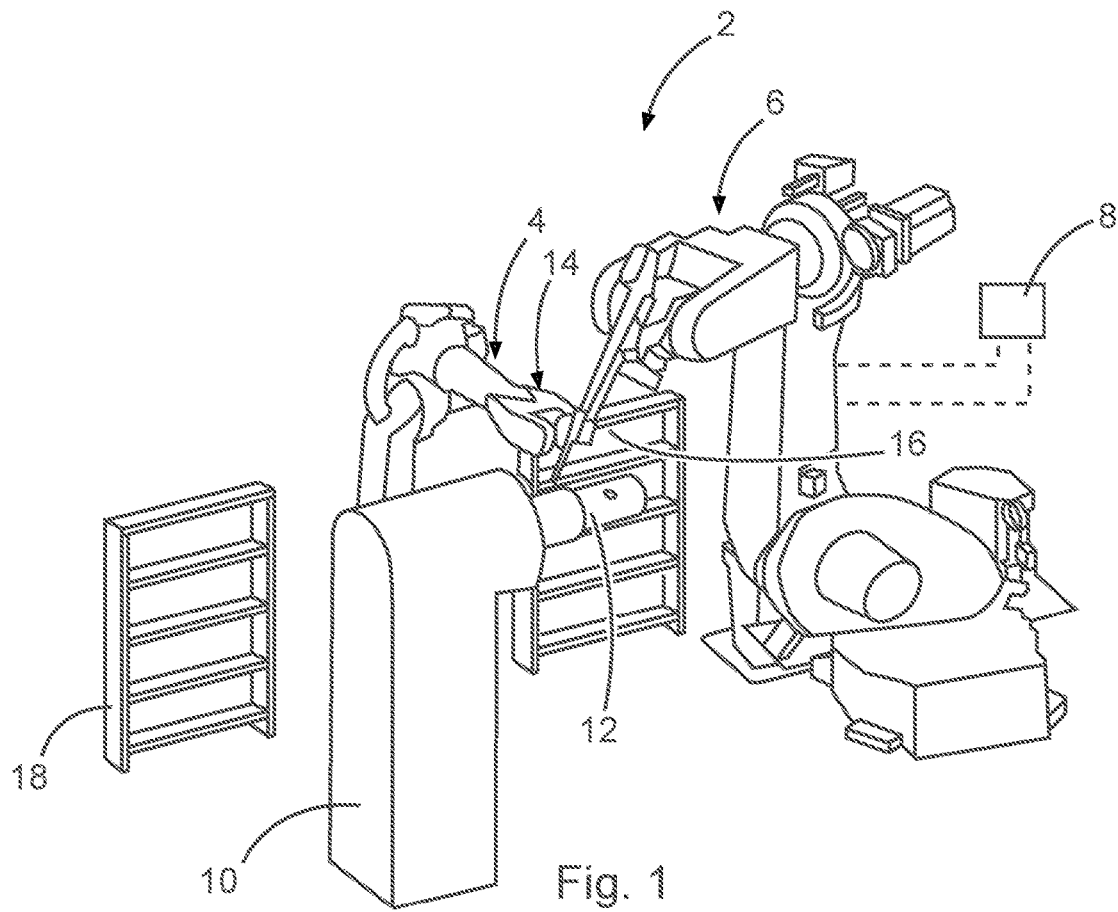
FIGS. 1 to 3 show an overview of a system for inserting or removing cutting inserts in a three-dimensional representation in various states.

FIG. 1 shows a system 2 for inserting and removing cutting inserts of a cutting tool. The system 2 comprises a first processing device 4 and a second processing device 6. The processing devices 4 and 6 are implemented as multi-axis robots and are coupled to a controller 8, which may be implemented as a microcontroller, computer, or the like. The controller 8 may also be integrated in the respective processing device 4 or 6 itself instead of in the form of a separate device. Furthermore, FIG. 1 shows a fixing device 10 in which a cutting tool 12, which can hold one or more cutting inserts, can be fixed, and aligned. By arranging the cutting tool 12 on the fixing device 10, it is possible to handle the cutting insert separately from a machine tool. The fixing device 10 is adapted to selectively align the cutting tool 12 so that cutting inserts can be attached thereto or removed therefrom.

The first processing device 4 has a gripping element 14 for holding or securing a cutting insert, while the second processing device 6 has a fastening tool 16 for fastening or releasing a fastening means holding the cutting insert. The controller 8 is adapted to control the first processing device 4 to hold the cutting insert and the second processing device 6 to fasten or loosen the fastening means when the cutting insert is held. In this way, a cutting insert can be exchanged by means of the two processing devices 4 and 6.

A plurality of cutting inserts may be arranged in a storage device 18, so that they can be removed from the first processing device 4 as required. For this purpose, the storage device 18 comprises a plurality of receptacles into each of which a cutting insert can be inserted. This is illustrated in a further figure below.

Figure 2:
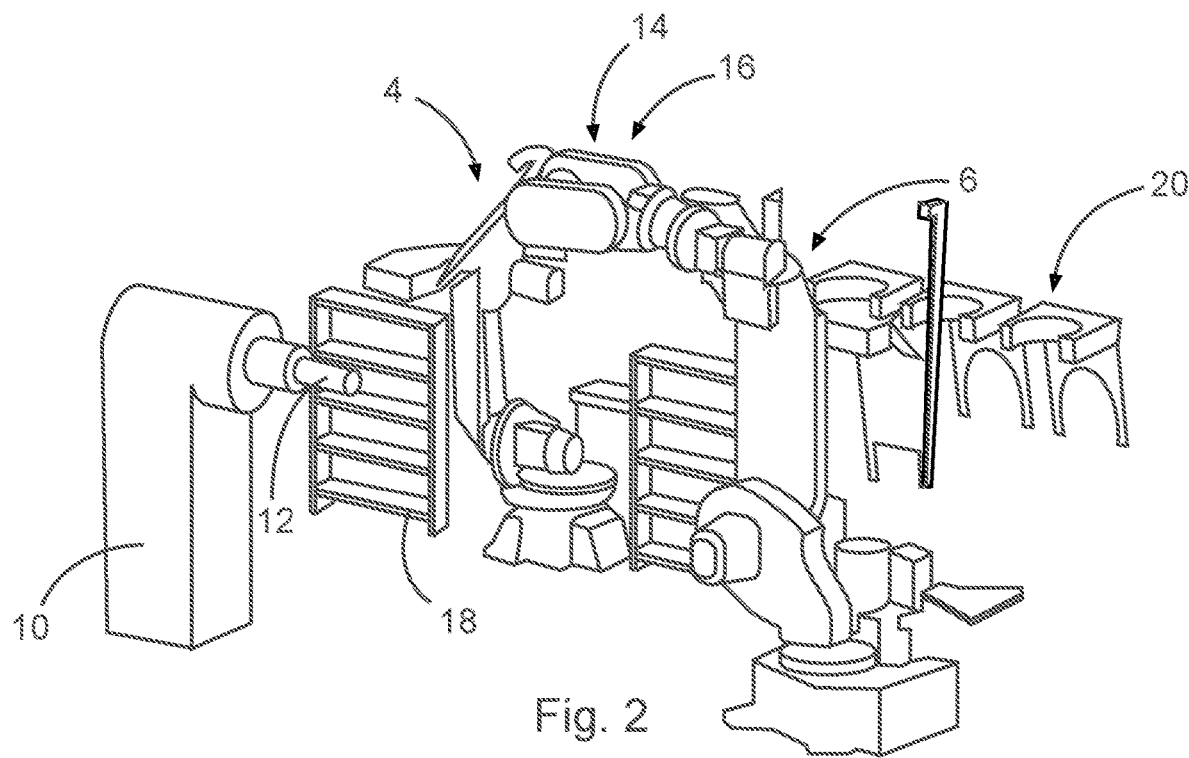

FIG. 2 shows a series of different handling tools 20 that are usable, as needed, on at least one of the processing devices 4 and 6 to handle different cutting inserts or cutting tools 12. For example, the first processing device 4 may receive different gripping elements 14 to be able to hold different cutting inserts. Meanwhile, the second processing device 6 may accommodate different fastening tools 16 to be able to loosen or fix different fastening means.

Figure 3:
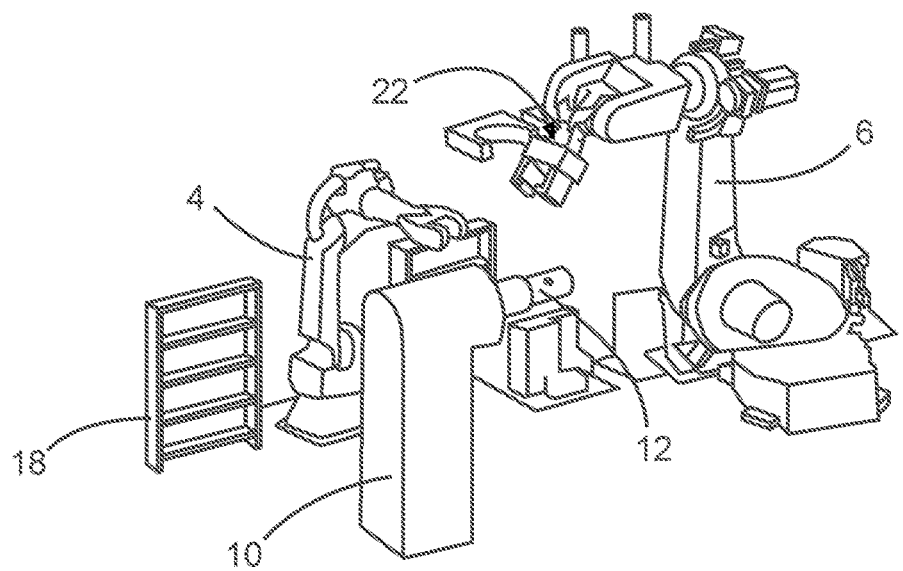

In FIG. 3, a tool carrier gripping element 22 is exemplarily shown on the second processing device 6, which is adapted to grip the cutting tool 12 and move it, for example, from a respective machine tool or a transport device in which a plurality of cutting tools 12 with worn or already replaced cutting inserts are arranged, into the fixing device 10 or vice versa.

Figure 4:
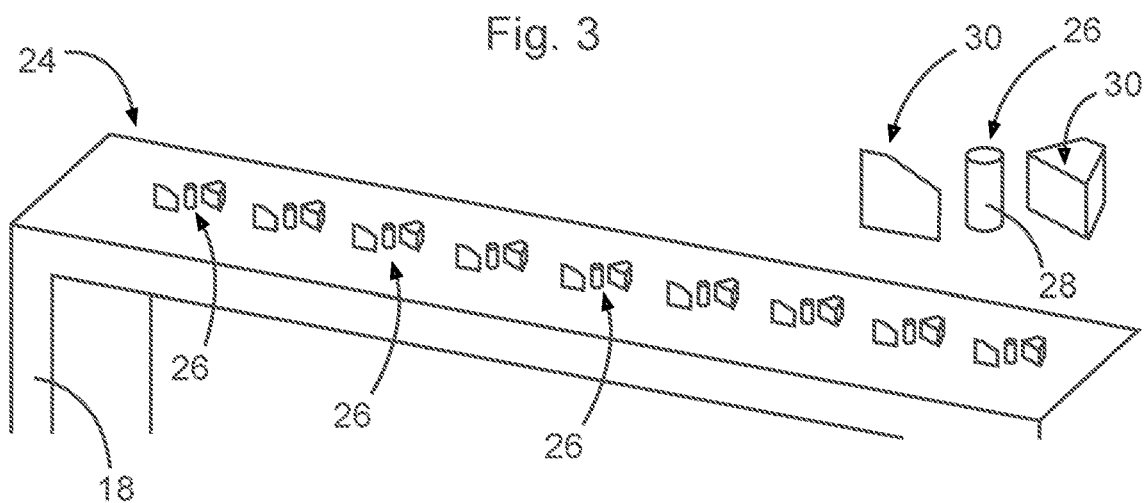
FIG. 4 shows a storage device with holders for receiving cutting inserts.
Figure 5A:
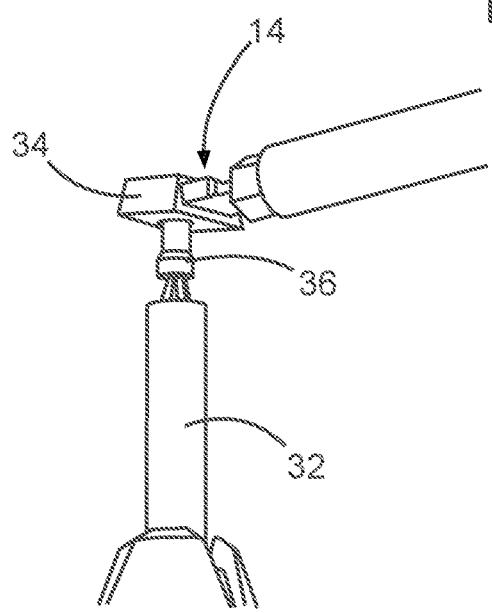
FIGS. 5a and 5b show a screw driving device on a cutting insert.
Figure 5B:
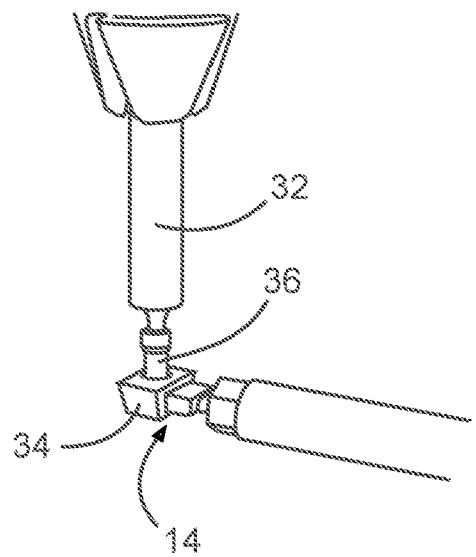

FIG. 4 shows a detail of the storage device 18. A plurality of receptacles 26 are arranged on a top surface 24, which are configured to receive or align cutting inserts only in a particular orientation. The cutting inserts may be, for example, indexable inserts. For this purpose, the receptacles 26 each comprise, by way of example, a pin 28 surrounded by two centering flanks 30. The cutting inserts may have, for example, a central bore which is provided for receiving the fastening means. With this central bore, the cutting inserts are each placed on the pin 28 and aligned by surface contact with the centering flanks 30 so that they subsequently rest flush on the upper surface 24 between the centering flanks 30 in a precisely predefined orientation. The first processing device 4 can then grip a cutting insert in the predefined orientation, and then subsequently position it precisely on the cutting tool 12 or the relevant machine tool. Consequently, a complex check of the instantaneous orientation of the cutting inserts after their removal from the receptacle 26 is not necessary FIGS. 5a and 5b show a screw driving device 32 which may be arranged on the second processing device 6. The gripping element 14 of the first processing device 4 is configured as a gripping suction cup and, in the embodiment shown, is in surface contact with a cutting insert 34 to hold it by utilizing a vacuum, while the screw driving device 32 rotates a fastening means 36 to loosen or fasten the cutting insert 34.

Figure 6:
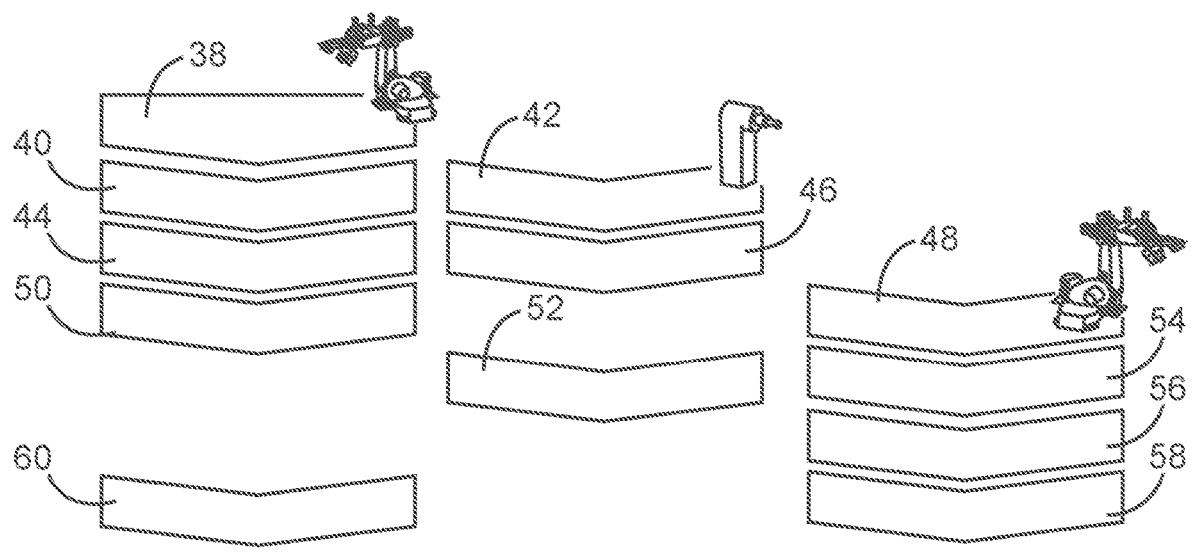
FIGS. 6 and 7 each show a method for inserting or removing cutting inserts of a cutting tool in a block-based embodiment.

FIG. 6 shows a first variant of a method for inserting or removing cutting inserts of a cutting tool. Exemplarily, it starts with picking up 38 a cutting tool 12, for example from a transport device, and transferring 40 it to the fixing device 10, which picks up 42 the cutting tool 12. At the second processing device 6, the handling tool may be changed 44 to subsequently approach the cutting tool 12. The cutting tool 12 may be positioned 46 by the fixing device 10 in order to be able to reach the cutting insert in question easily or from the desired direction. The first processing device 4 fixes 48 a cutting insert to be replaced, for example an indexable insert 34. As shown in FIG. 5a, the fastening means 36 may be released 50. The cutting tool 12 may then be repositioned 52 to allow the indexable insert 34 to be transported 54 away from the first processing device 4. A new insert 34 is then transported 56 and fixed 58 to be subsequently fastened 60. The cutting tool 12 may be oriented during loosening 50 so that the fastening means 36 is unscrewed from below, while during fastening 60 the screwing is performed from above and assists gravity in positioning the insert 34.

Figure 7:
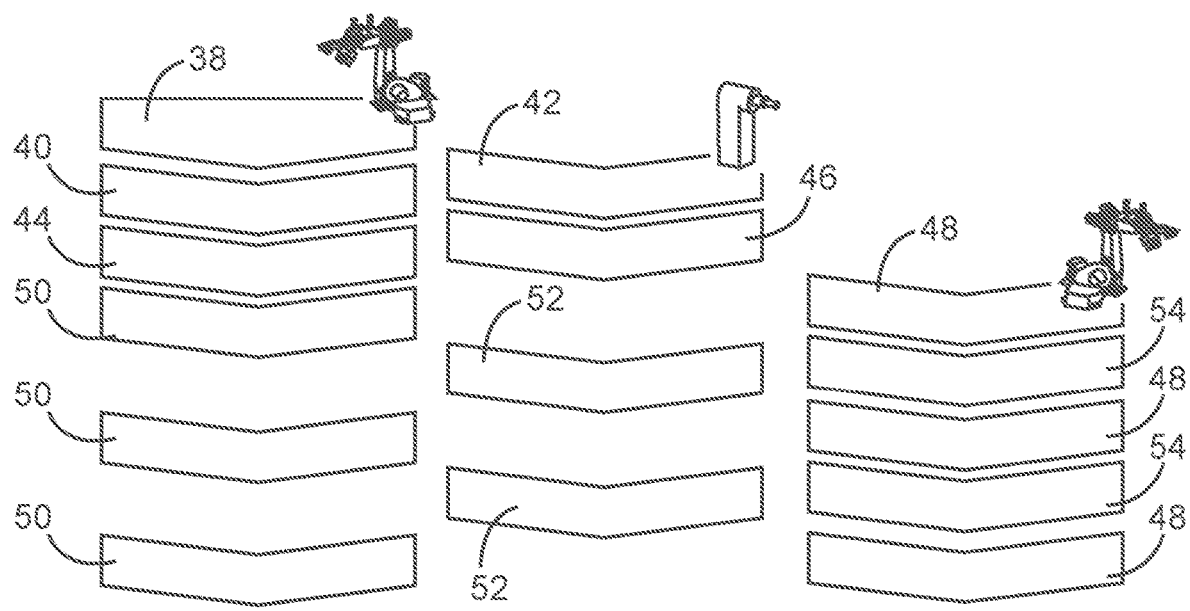

In FIG. 7, a slight variation is shown in which multiple cutting inserts are replaced in succession. Thus, the cutting tool 12 is positioned 52 a plurality of times and a plurality of fastening means 36 are loosened 50 in sequence.

Supplementally, it should be noted that "comprising" does not exclude other elements or steps, and "a" or "one" does not exclude a plurality. It should further be noted that features described with reference to any of the above embodiments may also be used in combination with other features of other embodiments described above. Reference signs in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 System
4 first processing unit
6 second processing device
8 Control
10 Fixing device
12 Cutting tool
14 Gripping element
16 Fastening tool
18 Storage device
20 Handling tool
22 Tool carrier gripping element
24 Top
26 Receptacle
28 Pin
30 Centering flank
32 Screw driving device
34 Machining insert
36 Fastening means
38 Picking up
40 Transferring
42 Picking up cutting tool
44 Changing handling tool
46 Positioning by fixing device
48 Fixing cutting insert
50 Releasing fastening means
52 Positioning cutting tool
54 Transport (departing) cutting insert
56 Transport (arriving) cutting insert
58 Fixing cutting insert
60 Fastening cutting insert

The invention claimed is:

1. A system for inserting or removing cutting inserts of a cutting tool, comprising:
   a first processing device;
   a second processing device;
   a controller coupled to the first processing device and the second processing device;
   a storage device having a plurality of receptacles for temporarily storing the cutting inserts, the storage device configured to insert the cutting inserts into and remove the cutting inserts from the plurality of receptacles, each of the plurality of receptacles is configured to accommodate one of the cutting inserts,
   wherein the at least one receptacle comprises a centering device shaped complementary to the cutting insert and configured to hold the cutting insert in a predetermined orientation,
   wherein the first processing device comprises a gripping element for holding or securing a cutting insert,
   wherein the second processing device comprises a plurality of fastening tools each configured for fastening or loosening a fastening means holding the cutting insert, and
   wherein the controller is adapted to control the first processing device to hold the cutting insert and to control the second processing device, when the cutting insert is held, to fasten or loosen the fastening means.

2. The system according to claim 1, wherein the gripping element comprises a suction gripper or a clamping gripper.

3. The system according to claim 1, wherein one of the plurality of fastening tools comprises a screw driving device.

4. The system according to claim 1, wherein at least one of said first processing device and said second processing device is a multi-axis robot.

5. The system according to claim 1, further comprising a separate fixing device for receiving a cutting tool to which the cutting insert is attachable for use, for inserting and removing the cutting insert with the cutting tool arranged on the fixing device.

6. The system according to claim 5, wherein the fixing device is arranged in an area which is located in a working area of the first processing device and the second processing device.

7. The system according to claim 1, wherein at least one of said first processing device and said second processing device is adapted to carry a replaceable handling tool.

8. The system according to claim 7, wherein the controller is configured to read in an identifier of the cutting tool carrying the cutting insert when handling the cutting insert and to control the at least one of the first and second processing devices so that the at least one of the first and second processing devices receives a corresponding handling tool.

9. A method of inserting or removing cutting inserts of a cutting tool, comprising:
positioning a gripping element of a first processing device on a cutting insert;
holding the cutting insert by the gripping element;
positioning a fastening tool of a second processing device on a fastening means holding the cutting insert;
fastening or loosening the fastening means by the fastening tool with the cutting insert held in place;
releasing the cutting insert by the first processing device; and
inserting the cutting insert into a receptacle of a storage device, the receptacle comprising a centering device shaped complementary to the cutting insert and configured to hold the cutting insert in a predetermined orientation.

10. The method of claim 9, further comprising:
removing the cutting tool carrying the cutting insert from a machine tool or a transport device;
inserting the cutting tool into a fixing device;
after handling the cutting insert with the cutting tool arranged in the fixing device, removing the cutting tool from the fixing device, and
inserting the cutting tool into the machine tool or the transport device.

11. The method according to claim 9, wherein the holding comprises applying a vacuum to a suction gripper or moving members of a clamping gripper to clamp the cutting insert.

12. The method of claim 9, wherein said fastening or unfastening comprises operating a screw driving device on said second processing device.

* * * * *